No. 744,777. PATENTED NOV. 24, 1903.
J. E. MARTIN.
QUICK CLOSING BALANCED AND NON-RETURN VALVE.
APPLICATION FILED FEB. 5, 1903.
NO MODEL.
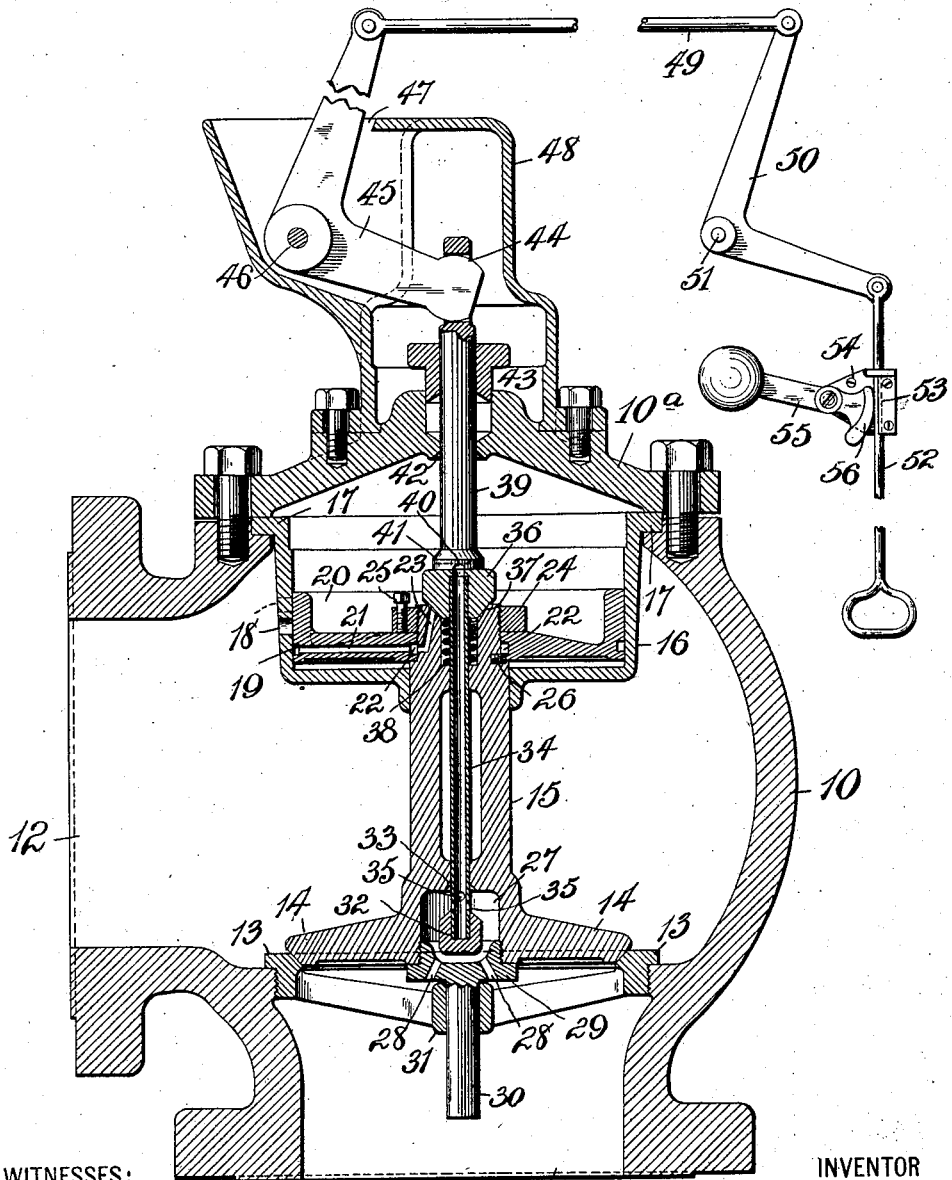
WITNESSES:
INVENTOR
Joseph E. Martin
BY
W. B. Hutchinson
ATTORNEY No. 744,777. Patented November 24, 1903.

UNITED STATES PATENT OFFICE.

JOSEPH E. MARTIN, OF NEWARK, NEW JERSEY.

QUICK-CLOSING BALANCED AND NON-RETURN VALVE.

SPECIFICATION forming part of Letters Patent No. 744,777, dated November 24, 1903.

Application filed February 5, 1903. Serial No. 141,967. (No model.)

*To all whom it may concern:*

Be it known that I, JOSEPH E. MARTIN, of Newark, Essex county, New Jersey, have invented certain new and useful Improvements in Quick-Closing Balanced and Non-Return Valves, of which the following is a full, clear, and exact description.

My invention relates to improvements in valves, and especially to such valves as are used in connection with a boiler or battery of boilers to control the main feed-pipe. While the valve is not necessarily limited to this use, it is especially designed for it. It is well known by the trade that a check or non-return valve and a balance-valve are unlike in principle, and yet the object of my invention is to reconcile this difference in a simple manner and produce a simple, compact, and positive valve which can be hand-operated, too, if necessary, which can operate as an automatic shut-off valve, and in general to arrange the parts so that the valve movements are easy, yet positive, and so that the main valve will operate as a quick-closing valve and as a balance-valve and will operate or maintain a certain position without hammering.

My invention also contemplates the improvement of certain details of construction, which will be especially pointed out.

With these ends in view my invention consists of certain features of construction and combinations of parts, which will be hereinafter described and claimed.

Reference is to be had to the accompanying drawing, forming part of this specification, in which similar figures of reference refer to similar parts.

The figure is a central vertical section of a valve, showing my improvements.

The valve has a main or body casing 10, with an inlet 11, adapted to connect with the boiler, and with an outlet 12 to connect with the line. The body-casing is preferably made in two parts having a removable top or bonnet $10^a$, and in the lower portion is a seat-ring 13 of usual construction, and this may be of any approved type. The main shut-off valve 14 seats against the ring 13 and is provided with a vertical shank 15, which enters the chamber or dash-pot 16, this chamber serving as a balance-chamber and having, preferably, a flange 17 at its upper edge to fit upon the corresponding shoulder of the body-casing 10, so that the pot or wall 16 can be conveniently held in place by the top or bonnet $10^a$. Through the chamber-wall 16 are holes 18 to admit pressure from the line to the balance-chamber, and these also are adapted to admit steam to the groove 19 on the piston 20, which works in the balance-chamber, and from the groove 19 the steam or pressure fluid passes through the radial duct 21 to a groove 22 around the shank 15 and from thence through a duct 23 to the interior of the balance-chamber. The piston 20 is held to the shank 15 by a nut 24 or equivalent fastening, and the nut 24 is held from turning by a screw 25, and the piston is guarded against turning on the shank by a pin 26. Obviously these particular details of fastening can be departed from without materially affecting the principle of the invention, and the arrangement of the communicating holes, grooves, and ducts can be changed so long as the pressure is properly admitted to the balance-chamber and so long as provision is made for having the piston cut off the steam-supply, as shown.

The joints around the piston 20 and around the shank 15 where it enters the balance-chamber are not steam-tight, and so there will always be sufficient steam or other pressure fluid below the piston 20 to act as a cushion for the piston, and in this connection I wish it understood that while I refer in the specification and claims to a piston as actuating the shank 15 and valve 14, still I intend to cover the use of a diaphragm as an equivalent for the piston.

In the lower part of the shank 15 and within the valve 14 is a chamber 27, preferably annular, which communicates, by means of ducts 28, with the boiler-pressure below the valve. These ducts 28 are made through the head 29 of the tailpiece 30, and this head is screwed or otherwise fastened to the lower end of the chamber 27. A feature of the head 29, tailpiece 30, and guide 31, in which the tailpiece slides, is that the parts are of brass or other non-corrosive metal.

In the chamber 27 is an auxiliary valve 32, the upper portion of which is beveled to fit a seat 33 in the top of the chamber 27, and the valve 32 is carried by a hollow stem 34, which works longitudinally in the shank 15 and through which near the bottom are ports 35, so that when the valve 32 is open steam may enter from the chamber 27 through the port 35 to the stem 34, and so up to the balance-chamber, as will presently appear.

At the top of the stem 34 and within the balance-chamber is a second auxiliary valve 36, adapted to seat against the beveled seat 37 at the top of the shank 15, and it will be noticed that when the valve 36 is seated the valve 32 is unseated, and vice versa.

The valve 36 is normally pressed upward by a spring 38, which is held in a recess of the shank 15, and the valve has a stem 39, through which are ports 40, which communicate with the hollow stem 34 and with the balance-chamber surrounded by the wall 16. The stem 39 has a beveled valvular section 41, which is adapted to rise against the seat 42 in the top of the valve-casing, and which thus prevents steam from entering the stuffing-box 43, through which the stem 39 moves, and thus the stuffing-box can be packed safely while live steam is within the main casing of the valve.

The upper end of the stem 39 is slotted, as shown at 44, to provide a loose connection with the bell-crank lever 45, which is fulcrumed, as shown at 46, and has one end extending through the slot 47 in the housing 48. It will be seen that the housing protects all the exposed portions of the valve mechanism, and this is quite important, as such parts are apt to be struck and injured. In this connection it will be noticed that I have practically no exposed moving parts and that I dispense with the usual arrangement of piping and exterior cylinders and pistons, which are quite liable to become deranged and unworkable.

The upper end of the bell-crank 45 connects by a rod 49 with the second bell-crank 50, which is fulcrumed, as shown at 51, and its second end connects with a pull-rod 52, which moves opposite a shoulder 53 on a bracket-plate 54, to which is also fulcrumed the weighted lever 55, having a grip 56 to engage the pull-rod and bind it against the shoulder 53, so as to hold it in place. In this connection I wish it understood that I do not confine my invention to the use of the precise lever mechanism shown for operating the stem 39 and valve 36 and that likewise any suitable fastening means can be provided for securing the pull-rod 52 and the connected parts in position.

If the valve is to be closed, the rod 52 is pulled down, thus tilting the two bell-cranks 50 and 45 and moving down the valve 36 against the pressure of the spring 38, thus closing the duct 23 and opening the valve 32. The live steam will now enter through the ducts 28, chamber 27, port 35, stem 34, and duct 40, passing into the balance-chamber 16, and as the piston 20 is of larger area than the valve 14 and the ports 40 sufficiently large to admit steam faster than it can escape around the piston 20 and from the hole 18 the pressure on the upper side of the piston 20 will be greater than the pressure on its lower side, and the valve 14 will be pushed firmly to its seat by the downward movement of the piston 20, while the steam below the piston 20 by escaping slowly around the shank 15 will act as a cushion to prevent any sudden closing of the valve 14. The rod 52 can then be fastened by the grip 56, and the parts will remain in the position described. It will be obvious that after the valve 14 is once firmly seated any diminution of pressure beneath it will be greater than that resulting in the chamber 16, because the steam-leakage into the chamber 16 around the piston 20 tends to offset any such diminution of pressure, and consequently the valve 14 will retain its position, the pressure above it being very much greater than that upon the under surface of the piston 20.

When it is desired to open the valve, the rod 52 is released, and the valve 36 will rise from its seat, while the rising of the valve 32 closes the parts 35. In this position no steam can enter the chamber 16 through the ports 40, and consequently, the pressure on both sides of the piston 20 being equal, the valve 14 will rise, owing to the pressure beneath it being greater than that above it, assuming, of course, that the device is not intended to be operated in its open position except when the boiler to which it is attached is in use. The piston 20 being subjected to equal pressure on both sides, will, in connection with the chamber 16, operate as a dash-pot, and thus prevent any hammering of the valve 14. Should the pressure beneath the valve 14 suddenly decrease, it will immediately close and will so remain until the pressure increases, when it will open again. From this description it will be apparent that in the position lastly described—that is, when the rod 52 is released—the device will operate as a check or automatic shut-off valve; but when so desired the valve can be operated by means of the rod 52 to close it positively in the same manner as the ordinary shut-off valve.

Having thus described my invention, what I claim as new, and desire to secure by Letters Patent, is—

1. As an improved article of manufacture, a balanced and non-return valve having a main valve balanced by the pressure in the casing and arranged to close automatically and remain closed on the lessening of pressure on the inlet side of the said main valve.

2. As an improved article of manufacture, a balanced and a non-return valve having a main valve balanced by the pressure within the casing and closing by hand against the pressure at the inlet, also becoming unbalanced and closing automatically and remaining closed against the backflow upon the lessening of pressure at the inlet, and means for automatically unbalancing said main valve.

3. The combination with a main valve, of auxiliary valves working within the main valve and arranged to control connections on opposite sides of the main valve, automatic means for actuating said auxiliary valves and means for locking said auxiliary valves against operation.

4. A valve, comprising a main casing, a balance-chamber within the casing, a main valve to close the casing-inlet, a piston working in the balance-chamber, and a pair of valves working in unison in opposite sides of the main valve and arranged to open and close connections between the back side of the main valve and the balance-chamber and between the balance-chamber and the valve-casing.

5. The combination with the main casing having a suitable inlet and outlet, of a balance-chamber within the casing, a piston working in the balance-chamber, and controlling connections between the chamber and the main casing, a main valve to control the inlet of the main-valve casing, said valve being rigidly connected with the piston, and an auxiliary-valve mechanism working within the main valve, and controlling connections with the balance-chamber and the pressure behind the main valve.

6. In an apparatus of the kind described, the combination with a main casing having a suitable inlet and outlet, of the main valve controlling the inlet of the casing, said valve having an internal chamber with ports opening below the valve, a balance-chamber, a piston operating in the balance-chamber and connected to the main valve, and an auxiliary-valve mechanism operating within the main valve and controlling the connections between the balance-chamber and the pressure below the main valve.

7. In an apparatus of the kind described, the combination with the main valve, the balance-chamber, the piston working in the chamber and connected to the main valve, and fluid-pressure connections from below the main valve to the balance-chamber, of a valve mechanism working within the main valve and controlling the connections to the balance-chamber, and a fastening device by which the position of the internal valve mechanism may be fixed.

8. In an apparatus of the kind described, the combination of the connected piston and main valve, the balance-chamber in which the piston moves, fluid-pressure connections through the main valve and piston, a pair of valves operating in unison to open and close the said fluid-pressure connections, a lever mechanism for moving the pair of valves, and a fastening device for fixing the position of the valves.

9. In an apparatus of the kind described, the combination with the main casing and the balance-chamber therein, said chamber communicating with the main casing, of a main valve to close the inlet to the piston, the piston working in the balance-chamber and moving to open and close the connections with the main casing, a hollow stem moving longitudinally through the main valve and piston, said stem being adapted to carry pressure from behind the main valve to the balance-chamber, valves at opposite ends of the hollow stem, one valve operating to open and close the connection between the balance-chamber, and the pressure behind the main valve and the second valve acting to close the connection between the balance-chamber and the main casing, and manually-operated means for working the connected valves.

10. In a valve having the usual main valve and seating-ring, the combination with such valve of a detachable non-corrosive tailpiece working in a non-corrosive guide.

11. In an apparatus of the kind described, the combination with the main valve, the piston connected to the main valve and the balance-chamber, the piston having a duct connecting with the balance-chamber and through suitable mediums with the main casing, of a hollow stem extending longitudinally through the piston and main valve and serving to lead pressure from behind the main valve to the balance-chamber, a valve on the lower end of the stem to close the aforesaid pressure connection, a valve on the upper end of the stem to close the duct in the piston, and manually-operated means for operating the aforesaid connected valves.

12. The combination with a valve having moving parts extending beyond its casing, of a housing inclosing the said moving parts.

13. The combination with a main valve-casing and its exterior mechanism, of a sliding stem projecting through the casing and controlling the interior mechanism, a pull-rod, a lever mechanism connecting the pull-rod with the aforesaid sliding stem, and a fastening device to fix the position of the pull-rod.

14. The combination of a non-return valve, and means for converting the said valve into a balanced closing valve.

15. The combination with a main unbalanced valve, of a manually-operated auxiliary-valve mechanism connected with the main valve and adapted when actuated to convert the same into a balanced valve.

16. The combination of a balanced stop-valve provided with the means of automatically converting it into a non-return valve.

In testimony whereof I have signed my name to this specification in the presence of two subscribing witnesses.

JOSEPH E. MARTIN.

Witnesses:
WARREN B. HUTCHINSON,
J. G. DUNBAR.